Aug. 26, 1952     G. D. BERDAN     2,608,043
COMBINED MOWER AND TRIMMER
Filed Nov. 9, 1950
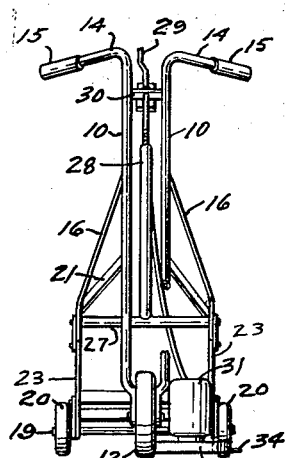
FIG. 2.
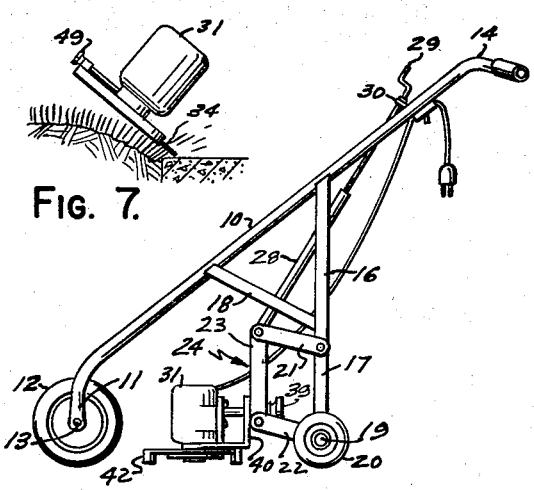
FIG. 7.     FIG. 1.
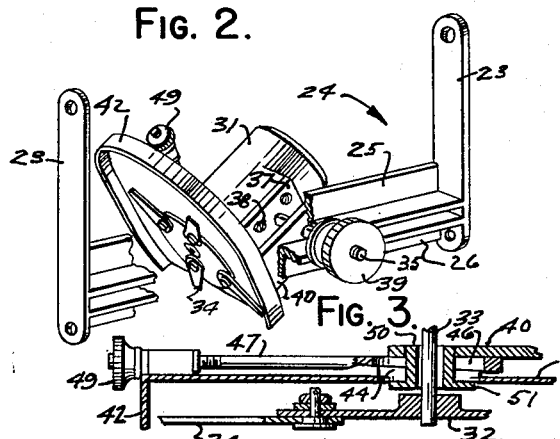
FIG. 3.
FIG. 6.
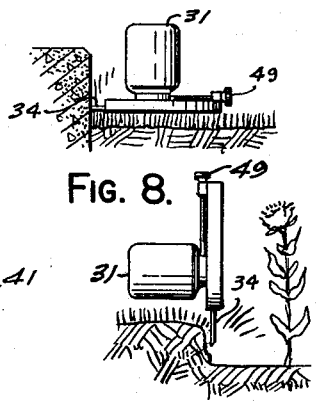
FIG. 8.
FIG. 9.
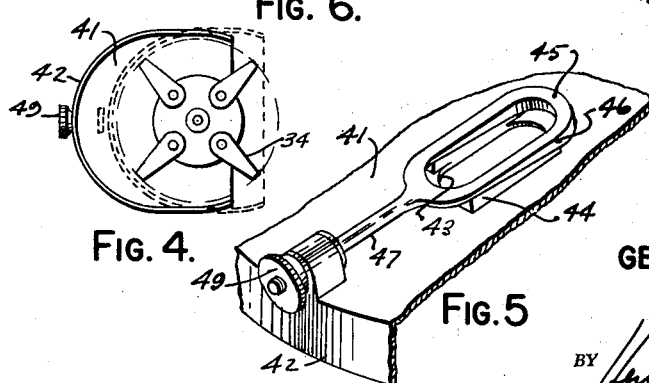
FIG. 4.
FIG. 5.
GEORGE D. BERDAN
*INVENTOR*
BY *Herbert J. Brown*
*ATTORNEY*

Patented Aug. 26, 1952

2,608,043

UNITED STATES PATENT OFFICE 2,608,043

COMBINED MOWER AND TRIMMER

George D. Berdan, Fort Worth, Tex.

Application November 9, 1950, Serial No. 194,744

3 Claims. (Cl. 56—25.4)

This invention relates to apparatus for mowing and trimming lawns, and has reference to my copending application, Serial No. 772,759, filed September 8, 1947, now Patent 2,556,790, granted June 12, 1951.

An object of the invention is to provide a combined mower and trimmer which will not only cut both horizontally and vertically, but will cut in any plane intermediate thereto.

Another object of the invention, in addition to the foregoing object, is to provide a combined mower and trimmer which is capable of being laterally adjusted with respect to the path of the apparatus.

A particular object of the invention is to provide a mower and trimmer capable of adjusting and positioning the cutting element vertically, horizontally, or at any angle therebetween, together with lateral and vertical adjustments for mowing, edging and beveling lawns.

The invention will be more readily understood by reference to the accompanying drawings and the following description.

Figure 1 is a side elevation of a combined mower and trimmer embodying the features of the present invention.

Figure 2 is a front elevation of Figure 1.

Figure 3 is an enlarged broken perspective of the motor support and showing the motor and cutting element mounted thereon.

Figure 4 is an enlarged bottom plan view of the cutting element and shield and showing an adjusted position of the latter by means of dotted lines.

Figure 5 is an enlarged broken perspective of a portion of the shield and showing means for adjusting the position of the same relative to the cutting element.

Figure 6 is an enlarged vertical sectional view of the motor shaft, cutting element and shield.

Figures 7, 8 and 9 are elevations of the motor, cutting element and shield, and showing the same positioned for beveling, cutting horizontally, and vertically, it being understood that the referred to parts are supported by the apparatus illustrated in Figures 1, 2 and 3.

The form of the invention shown includes a pair of forwardly and downwardly inclined parallel tubular frame members 10 which are bent downwardly, as at 11, at their lower ends for receiving a wheel 12 therebetween. An axle 13 is positioned through the frame ends 11 and the wheel 12 for rotatably securing the latter in place. The upper ends of the frame members 10 are bent outwardly to form handles 14, and may have handle grips 15 mounted on their outer ends. There is a pair of downwardly diverging frame members 16 depending from the inclined frame members 10 intermediate the ends thereof, and which diverging members terminate in vertical legs 17. Angular brackets 18 are secured between the diverging members 16 and the inclined members 10, in the manner illustrated in Figures 1 and 2, so as to brace the vertical legs 17. An axle 19 extends through the lowermost ends of the legs 17 and has wheels 20 mounted thereon outwardly of said legs.

Upper and lower parallel links 21 and 22, respectively, are pivotally secured to each leg 17 on the upper and lower ends of the latter, whereas the remaining ends of said links are pivotally connected with the vertical sides 23 of a motor mount 24. The vertical sides 27 are connected with each other by means of spaced parallel guides 25 and 26, arranged one above the other, as shown in Figure 3. There is a horizontal rod 27 rotatably connected between the upper ends of the motor mount sides 23, and which rod is provided with a welded or otherwise secured perpendicular threaded tubular member 28 which extends upwardly between the inclined members 10 and threadedly receives the end of a crank 29 journaled in a bracket 30 secured between said inclined members near the upper end thereof.

An electric motor 31 has an annular blade support 32 mounted on the end of its shaft 33, and which support has blades 34 pivotally mounted thereon at equal intervals around its periphery, as shown in detail in Figure 6. Although not shown in the drawings, it is to be understood that a disk cutter having rigid teeth therearound may be substituted for the described annular support and pivoted blades, and yet come within the scope of the invention. When the shaft 33 rotates, centrifugal force extends the blades 34 outwardly from the disk 32 and define a circle having a diameter substantially equal to one-half the distance between the vertical legs 17.

A shaft 35 extends between the guides 25 and 26 and has a rectangular plate 37 welded or otherwise secured on its forward end, and on which the motor 31 is mounted, as by means of screws 38. The remaining or rearward end of the shaft 35 threadedly receives a knurled hand knob 39 which contacts and bears against the guides 25 and 26. The shaft 35 also extends through one leg of an L-shaped bracket 40 which bears against the forward surfaces of the guides 25 and 26, whereas the remaining leg of the bracket 40 supports the end of the motor 31 and through which the motor shaft 33 projects. Between the motor 31 and the blade support 32 there is a flat D-shaped guard 41 having a depending U-shaped flange 42 around its arcuate portion. There is an elongated opening 43 in the center of the guard 41 and perpendicular to its straight side to accommodate the motor shaft 33. Inclined projections 44 are secured to the surface of the guard 41 on each side of the opening 43 and are arranged with their thickest ends toward the round side of said guard. An elongated ring 45 having wedges 46 integral with each side thereof is positioned for engagement on the first described wedges 44 for detachably securing and adjusting the position of the guard 41 relative to the circle defined by the pivoted blades 34. The wedges 44 and 46 are adjusted relative to each other by means of a shaft 47 integral with one end of the ring 45 and slidably positioned through a boss 48 on the surface of the guide 41 and near the round side thereof. A knurled nut 49 is threadedly engaged on the extending end of the last described shaft 47 and bears against the boss 48. A relatively large collar 50 is positioned through and has one end thereof secured to the horizontal leg of the bracket 40, whereas the remaining end of the collar extends through the ring 45 and the guard opening 43 where it terminates in a large flange 51 adapted to engage the inner surface of the guard 41. By turning the knurled nut 49, and moving the wedges 44 and 46 relative to each other, the guard 41 may be tightened or loosened against the inner surface of the flange 51, and whereby the guard may be moved inwardly and outwardly relative to the circle defined by the revolving blades 34.

In operation, the plane defined by the blades 34 is adjusted relative to the grass to be cut by loosening the hand knob 39, positioning the axis of the motor 31 in the desired angle, and by then tightening said hand knob and causing the upper leg of the bracket 40 to bear against the forward surfaces of the guides 25 and 26. By means of the last referred to operation, the plane of the blades 34 may be adjusted to cut vertically, as shown in Figure 9, horizontally as shown in Figure 8, or at any angle therebetween, as shown in Figure 7. The guard 41 is adjusted inwardly and outwardly by means of the nut 49 in the manner previously described and whereby the relative lengths of the blades 34 may be changed with respect to the straight side of the guard 41. It will also be noted that by reason of the described arrangement for adjusting the guard 41 that the straight edge thereof may be entirely rotated about the motor shaft 33. For example, when mowing horizontally the straight side of the guard 41 can be positioned forwardly with respect to the forward movement of the apparatus, whereas the same straight side is positioned to one side of the apparatus when making vertical or angular cuts. By reason of the transverse arrangement of the guides 25 and 26, the blades 34 may be positioned on either side of the path of the apparatus, or at any desired location therebetween. It is frequently necessary to adjust the height of the cutting blades 34 relative to the bottoms of the wheels 12 and 20. In such instances, the height is varied by merely turning the crank 29. The apparatus is guided by means of the handles 14, and lateral forces applied thereto will cause the front wheel 12 to slide laterally on the lawn, thus allowing the operator to move the apparatus in any desired direction.

The present invention is not limited to the construction herein shown and described, but may be made in many ways within the scope of the appended claims.

What is claimed is:

1. In a mowing and trimming machine, a wheel supported frame including a pair of spaced parallel vertical members therein, a pair of spaced parallel links pivotally secured at corresponding ends thereof on each of said vertical members, a vertical motor mount pivotally mounted on the remaining ends of said links, spaced horizontal guides carried by said motor mount and arranged one above the other between the sides of said mount, a shaft perpendicularly and slidably supported between said guides, a motor mounted on one end of and having its axis perpendicular to said shaft, a disk type cutter mounted on the shaft of said motor for rotation in a plane perpendicular thereto, and means carried by said frame raising and lowering said motor mount.

2. In a mowing and trimming machine, a frame comprised of a pair of forwardly and downwardly inclined parallel tubular frame members having a wheel mounted between the lower ends thereof and having the upper ends of said frame members bent outwardly so as to form handles, a pair of downwardly diverging frame members secured to the first said frame members intermediate the ends thereof, the lower ends of the last said frame members terminating in parallel downwardly directed legs, wheels mounted on the lower end of said legs, a pair of parallel links pivoted to each said leg on the upper and lower portions thereof, a vertical motor mount pivotally secured to said links and arranged parallel with said legs, horizontal spaced parallel guides forming a part of said motor mount, a motor having a rotary cutter mounted on its shaft, a shaft extending from said motor perpendicular to the axis of the latter, means detachably securing the projecting end of the last named shaft between said horizontal guides, and means adjustably raising and lowering said motor mount.

3. In a mowing and trimming machine as defined in claim 2, the construction wherein said means is comprised of an L-shaped bracket, one leg of which is adapted to bear against the forward surfaces of said guides and the remaining leg of which bracket is adapted to support said motor, and a threaded hand knob on the end of said motor supporting shaft and arranged to bear against said guides on the sides thereof opposite said L-shaped bracket.

GEORGE D. BERDAN.

REFERENCES CITED

The following references are of record in the file of this patent:

UNITED STATES PATENTS

| Number | Name | Date |
|---|---|---|
| 1,189,519 | Word | July 4, 1916 |
| 1,476,521 | Kell | Dec. 4, 1923 |
| 2,139,353 | Bruder | Dec. 6, 1938 |
| Re. 21,274 | Orr | Nov. 21, 1939 |
| 2,483,683 | Wells | Oct. 4, 1949 |
| 2,489,730 | Soenksen | Nov. 29, 1949 |
| 2,491,993 | McClay | Dec. 20, 1949 |